(12) United States Patent
Croman et al.

(10) Patent No.: US 10,128,930 B2
(45) Date of Patent: *Nov. 13, 2018

(54) FULLY FLEXIBLE MULTI-TUNER FRONT END ARCHITECTURE FOR A RECEIVER

(71) Applicant: Silicon Laboratories Inc., Austin, TX (US)

(72) Inventors: Russell Croman, Buda, TX (US);
Nebojsa Stanic, Austin, TX (US);
Michael Johnson, Austin, TX (US);
Dan B. Kasha, Seattle, WA (US);
Michael R. May, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,967

(22) Filed: Sep. 21, 2017

(65) Prior Publication Data

US 2018/0026701 A1 Jan. 25, 2018

Related U.S. Application Data

(63) Continuation of application No. 15/086,248, filed on Mar. 31, 2016, now Pat. No. 9,787,388.

(51) Int. Cl.
*H04B 1/18* (2006.01)
*H04B 7/08* (2006.01)
(Continued)

(52) U.S. Cl.
CPC ............ *H04B 7/08* (2013.01); *H04B 1/0064* (2013.01); *H04B 1/16* (2013.01); *H04B 1/0075* (2013.01)

(58) Field of Classification Search
CPC ........... H04B 7/08; H04B 1/16; H04B 1/0064
(Continued)

(56) References Cited

U.S. PATENT DOCUMENTS 7,167,694 B2 1/2007 Khoini-Poorfard et al.
7,447,491 B2 11/2008 Khoini-Poortard
(Continued)

OTHER PUBLICATIONS

Texas Instruments, "Dual VCO/PLL Synthesizer With IF Down-Conversion," Apr. 2005—Revised Dec. 2005, 31 pages.
(Continued)

*Primary Examiner* — Sanh D Phu
(74) *Attorney, Agent, or Firm* — Trop, Pruner & Hu, P.C.

(57) ABSTRACT

In an example, a method includes: in a first mode, causing a first tuner of an entertainment system to receive and process a first RF signal from a first antenna configured for a first band to output a first audio signal of a first radio station and causing a second tuner of the entertainment system to receive a second RF signal from a second antenna configured for the first band to determine signal quality metrics for one or more radio stations of the first band; in a second mode, causing the first tuner to output a first signal representation of the first RF signal and causing the second tuner to receive and process the second RF signal to output a second signal representation of the second RF signal; and causing a phase diversity combining circuit to process the first and second signal representations to output an audio signal of the first radio station, without disruption of output from the entertainment system of a broadcast of the first radio station.

20 Claims, 4 Drawing Sheets

(51) Int. Cl.
*H04B 1/00* (2006.01)
*H04B 1/16* (2006.01)

(58) Field of Classification Search
USPC ....................................................... 455/160.1
See application file for complete search history.

(56) References Cited

U.S. PATENT DOCUMENTS

| | | | |
|---|---|---|---|
| 7,697,913 B2 * | 4/2010 | Shatara | H04B 7/0802 |
| | | | 455/222 |
| 8,254,862 B2 | 8/2012 | Kasha et al. | |
| 9,787,388 B1 * | 10/2017 | Croman | H04B 7/08 |
| 2015/0188582 A1 | 7/2015 | Kahrizi | |
| 2016/0149632 A1 | 5/2016 | Ohara | |

OTHER PUBLICATIONS

Kyle Slightom, "Dual-Loop Clock Generator Cleans Jitter, Provides Multiple High-Frequency Outputs," Jan. 2014, 4 pages.
Silicon Labs, "High-Performance Automotive AM/FM Radio Receiver and HD Radio™/DAB/DAB+/DMB/DRM Tuner," Mar. 12, 2015, 3 pages.
Silicon Labs, "High-Performance Automotive AM/FM Radio Receiver and HD Radio™/DAB/DAB+/DMB/DRM Tuner with Audio System," Mar. 12, 2015, 3 pages.

* cited by examiner

FULLY FLEXIBLE MULTI-TUNER FRONT END ARCHITECTURE FOR A RECEIVER

This application is a continuation of U.S. patent application Ser. No. 15/086,248, filed Mar. 31, 2016, the content of which is hereby incorporated by reference.

BACKGROUND

In certain radio reception environments such as an automotive environment, multiple antennas and tuners may be present to enable a variety of use cases such as phase diversity reception, dual band reception, audio and data reception, among others. Existing fully-integrated techniques can share one antenna between multiple radio frequency (RF) and/or intermediate frequency (IF) signal paths only with degraded performance on one or both of the signal paths. For instance, if a loop-through buffer is used to feed the RF signal to a secondary path, the secondary path's performance is generally compromised relative to the primary path due to the loop-through buffer's RF characteristics. This asymmetric performance is undesirable for a number of reasons.

As another example, if one antenna is connected to two RF inputs, and those inputs are designed to each present twice the desired termination impedance for the antenna, an effective RF split is realized, but the two paths will be compromised due to sharing power between the inputs. One solution to this problem is inclusion of an external (to one or more integrated tuners) active splitter circuit to buffer the antenna signal. However, this circuit increases component counts, raises costs and complexity, including routing issues and power consumption.

SUMMARY OF THE INVENTION

In one aspect, an apparatus comprises a first low noise amplifier (LNA) to receive and amplify a first radio frequency (RF) signal of a first band, received from a first antenna and a first tuner having a first plurality of mixers including a first mixer to selectively be coupled to the first LNA to receive and downconvert the first RF signal received from the first LNA to a first downconverted signal. The first tuner may be configured to process the first downconverted signal. In addition, the apparatus further comprises a second LNA to receive and amplify a second RF signal of a second band, received from a second antenna, and a second tuner having a second plurality of mixers including a second mixer to selectively be coupled to the second LNA to receive and downconvert the second RF signal received from the second LNA to a second downconverted signal and a first mixer to selectively be coupled to the first LNA to receive and downconvert the first RF signal received from the first antenna to a third downconverted signal. The second tuner may be configured to be controllable to process a selected one of the second downconverted signal and the third downconverted signal provided by a selected one of the second mixer and the first mixer of the second tuner.

In a first mode of operation, the first LNA is coupled to provide the first RF signal to the first tuner and to the second tuner simultaneously. The apparatus may further include a third LNA to receive and amplify a third RF signal of the first band, received from a third antenna, where the third LNA is coupled to provide the third RF signal to the second tuner to enable phase diversity reception of the first band in a second mode.

In an example, the apparatus may further include an audio processor and a phase diversity combining circuit to seamlessly transition from the first mode to the second mode without audible impact to an audio signal output from the apparatus.

In an example, the first plurality of mixers further includes a second mixer to selectively be coupled to the second LNA to receive and downconvert the second RF signal to a fourth downconverted signal. The apparatus may further include a first loop-through buffer coupled to an output of the first LNA to receive the first RF signal and output the first RF signal to a second receiver coupled to the apparatus, where the apparatus includes a first receiver. The apparatus may further include a second loop-through buffer coupled to an output of the second LNA to receive the second RF signal and output the second RF signal to the second receiver. The apparatus may further include a selector coupled to an output of the first loop-through buffer and an output of the second loop-through buffer and controllable to output a selected one of the first and second RF signals to the second receiver.

In an example, the first tuner may include a multiplexer coupled to an output of the first plurality of mixers, the multiplexer controllable to provide an output of one of the first plurality of mixers to a signal processing path of the first tuner. The first tuner may further include a first frequency generator to operate at a first frequency and the second tuner may further include a second frequency generator to operate at a second frequency substantially different than the first frequency when the first tuner and the second tuner are to operate in a first band. A filter may be coupled to an output of the first LNA to provide a notch response to reduce coupling from the second frequency generator. In an example, the first LNA, the first tuner, the second LNA and the second tuner are configured on a first semiconductor die.

In another aspect, a method includes: in a first mode, causing a first tuner of an entertainment system to receive and process a first RF signal from a first antenna configured for a first band to output a first audio signal of a first radio station and causing a second tuner of the entertainment system to receive a second RF signal from a second antenna configured for the first band to determine signal quality metrics for one or more radio stations of the first band; in a second mode, causing the first tuner to output a first signal representation of the first RF signal and causing the second tuner to receive and process the second RF signal from the second antenna to output a second signal representation of the second RF signal; and causing a phase diversity combining circuit to process the first and second signal representations to output an audio signal of the first radio station, without disruption of output from the entertainment system of a broadcast of the first radio station.

In an example, the method further includes, in a third mode, causing the first tuner to receive and process the first RF signal from the first antenna to generate a first audio signal of the first radio signal, and causing the second tuner to receive and process the second RF signal from the second antenna to generate a second audio signal of a second radio station, and causing a linker circuit to transition from the first audio signal to the second audio signal, where the linker circuit is to output a final audio signal without impairments due to the transition.

In another example, a non-transitory computer readable medium include(s) instructions that when executed enable the entertainment system to perform one or more methods as described herein.

In yet another aspect, a system includes, at least, multiple antennas and a first integrated circuit (IC) including a first tuner and a second tuner. In an example, the first IC includes: a first pad to receive a first RF signal from a first FM antenna and symmetrically output the first RF signal to the first tuner and the second tuner, and to a first loop-through buffer to provide the first RF signal to a second IC; and a second pad to receive a second RF signal from a second FM antenna and symmetrically output the second RF signal to the first tuner and the second tuner, and to a second loop-through buffer to provide the second RF signal to the second IC. In turn, the first tuner may have a first plurality of mixers including a first mixer to receive and downconvert the first RF signal to a first downconverted signal, a second mixer to receive and downconvert the second RF signal to a second downconverted signal, and a first signal processing path to process a selected one of the first downconverted signal and the second downconverted signal. In turn, the second tuner may have a second plurality of mixers including a second mixer to receive and downconvert the second RF signal to a fourth downconverted signal, a first mixer to receive and downconvert the first RF signal to a third downconverted signal, and a second signal processing path dynamically controllable to process a selected one of the third downconverted signal and the fourth downconverted signal. In an example, the first IC may further include a microcontroller to dynamically control transitions of the first tuner and the second tuner between a plurality of operating modes while a first audio signal is output by at least one of the first and second tuners.

In yet another aspect, an IC includes a first voltage controlled oscillator (VCO) to oscillate at a first oscillation frequency, a second VCO to oscillate at a second oscillation frequency, a first divider coupled to the first VCO to produce a first LO signal, and a second divider coupled to the second VCO to produce a second LO signal. In an example, the first LO signal and the second LO signal are substantially at a common frequency, and a frequency range of the first oscillation frequency and a frequency range of the second oscillation frequency are mutually exclusive.

DETAILED DESCRIPTION

In various embodiments, a radio receiver including one or more tuners may have an integrated active splitter to route an incoming RF signal to multiple paths in a symmetric and seamless manner. Still further, embodiments enable full flexibility in choosing which of multiple antennas feeds which of multiple signal paths. This selection can be changed dynamically in real time as a radio reception environment and/or listener station selection changes. An architecture as described herein allows for fully flexible reception of one or more radio stations for primary reception, phase diversity reception, secondary reception (e.g., rear-seat entertainment), background/alternate station scanning, and/or traffic data reception from one or more antennas with symmetric performance and/or minimal performance loss.

As will be described further herein, different and dynamic modes of operation are possible. For example, reception could begin by receiving an FM station from one antenna connected to a first IF path of a first tuner. Subsequently, a second antenna may be connected to a second IF path of a second tuner and tuned to the same station, to realize phase diversity reception. The system could subsequently return to single antenna reception, and the second IF signal path could be used for background station scanning from either antenna input, all without perturbing the audio content being listened to from the first IF path. In other use cases, the second path could subsequently be tuned to a digital audio broadcast (DAB) station using a Band-III antenna input for the purposes of DAB/FM seamless linking. Once the link to DAB audio content is made, the first IF path of the first tuner could be configured to receive its input from the second Band-III antenna to realize phase diversity reception for DAB. Or the first tuner may be configured to perform background scanning, either for DAB or FM bands, while the second tuner is to output the audio content via the second IF path. In addition to background scanning, the tuners may be used also to obtain supplemental content such as radio broadcast data system/radio data system (RBDS/RDS) content, traffic message channel (TMC) content, and Transport Protocol Exports Group (TPEG) content. Note that during any or all of the above modes, selected RF inputs received on-chip via one or more RF input pads may be output to a downstream component via a loop-through path.

Figure 1A:
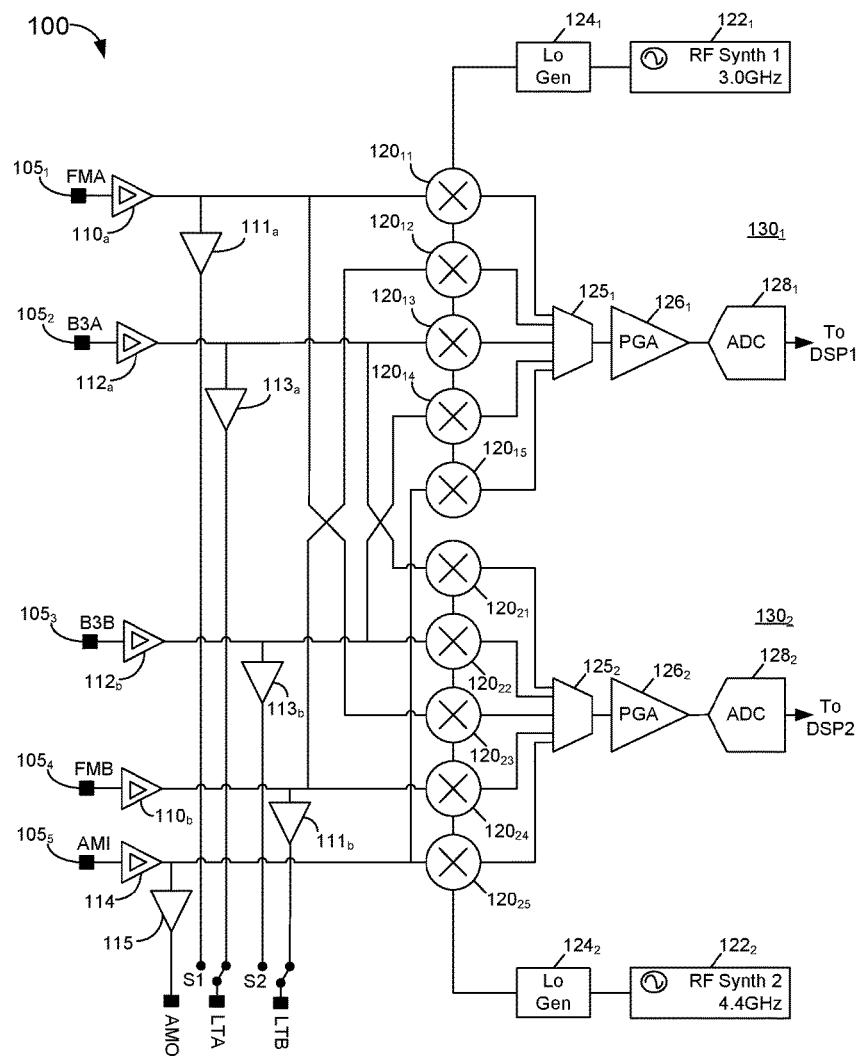
FIGS. 1A and 1B are block diagrams of a receiver in accordance with an embodiment.
Figure 1B:
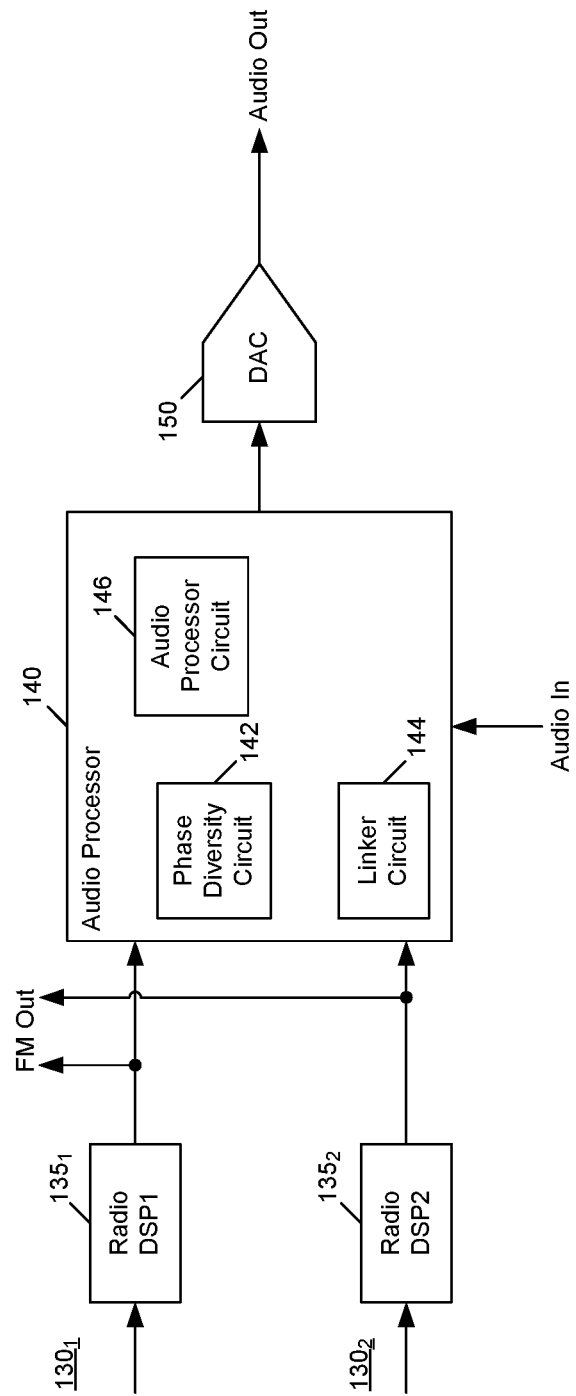

Referring now to FIGS. 1A and 1B, shown are block diagrams of a receiver in accordance with an embodiment. More specifically, receiver 100 may be a multi-tuner arrangement, which may be configured on a single semiconductor die. As described herein, receiver 100 provides for integrated active splitting of incoming RF signals from one or more antennas, to enable dual tuners to process the same RF signal with symmetric performance. That is, the same RF signal is provided simultaneously to the two tuners at the same power level such that the two tuners process an identical (or at least nearly or substantially identical) signal. Still further, with active splitting as described herein, embodiments enable seamless transitions between different modes of operation in which RF inputs from different antennas can be switchably coupled to the different tuners.

As illustrated in FIG. 1A, receiver 100 includes a number of inputs pads $105_1$-$105_5$. In the illustration shown, each input pad 105 may receive an RF input obtained from a given antenna (not shown in FIG. 1A, as such antennas may be implemented off-chip). In the embodiment of FIG. 1A, these RF inputs may be received in multiple bands. Specifically, two FM RF inputs (FMA and FMB), two Band-III RF inputs (B3A and B3B), and a single AM band RF input (AMI) are provided. As illustrated, the incoming RF input signals are coupled to corresponding amplifiers 110a, 110b, 112a, 112b, and 114. In an embodiment, each amplifier may be implemented as a low noise amplifier (LNA), possibly followed by an RF buffer.

In some cases, a simple buffer either integrated within the LNAs (as schematically shown in FIG. 1A) or coupled to an output of such LNAs, may be provided to buffer the amplified RF signal. This buffer may be provided, given that the amplifier output may couple to multiple tuners (and also potentially be output off-chip via a loop-through buffer). Thus to better accommodate this loading, such buffer may be incorporated within the corresponding LNAs or coupled to an output thereof.

In addition, embodiments may further provide a filtering function within or closely coupled to the output of the LNAs. More specifically, such a filter, which can be a low pass filter having a predetermined notch capability, can be used to filter noise from a frequency synthesizer of another tuner on-die. In one embodiment, this filter may be configured to have a notch at a frequency substantially around 2.8 Gigahertz (GHz). By providing this filtering capability substantially at the output of the LNAs, individual filters at an input of each of downstream mixers can be avoided.

As discussed above, receiver 100 is a dual-tuner receiver including a first tuner $130_1$ and a second tuner $130_2$. The tuners may be configured as intermediate frequency (IF) tuners to downconvert and process the incoming signals at a given IF frequency. However embodiments are not so limited and in other cases, the tuners may be configured as low IF or zero-IF (ZIF) tuners. With reference first to first tuner $130_1$, a set of mixers $120_{11}$-$120_{15}$ are provided. As seen, each mixer is coupled to receive an incoming amplified RF signal from one of amplifiers 110a/b, 112a/b, and 114. In turn, each mixer 120 downconverts the received RF signal with a mixing signal, received from a local oscillator (LO) $124_1$, which in turn receives an incoming clock signal, generated by an RF synthesizer $122_1$. In one embodiment, RF synthesizer $122_1$ may be configured for operation at substantially around 3.0 GHz. Depending upon the frequency of a desired channel or station, LO $124_1$ may be controlled (e.g., by an on-chip microcontroller (MCU) 150) to output the mixing signal at a given frequency. Further, to enable operation with minimal power consumption, MCU 150 may control the corresponding mixers 120 of the different tuners such that only a single mixer of each tuner is active at a given time. Such control may be effected, e.g., by disabling the non-selected mixers. In some cases, MCU 150 may disable the LO input to unselected (i.e., unused) mixers 120.

The downconverted signals output by mixers 120 are coupled through a selector $125_1$ (which in an embodiment may be implemented as a multiplexer) to a programmable gain amplifier $126_1$. After amplification and filtering in PGA $126_1$, the signal is digitized in an analog-to-digital converter (ADC) $128_1$. From there the digitized downconverted signal may be provided to a signal processing path of tuner $130_1$, which may perform various additional processing, including filtering, gain control, decoding and/or demodulation to output a demodulated signal such as demodulated FM or AM signals. In some cases, depending upon the band of operation, the output of a given tuner $130_1$ may be a modulated signal, such as in the case of DAB or HD input.

As further shown in FIG. 1A, loop-through paths are provided to enable output of the amplified RF signals (from the output of amplifiers 110/112/114) to be communicated to one or more other components, such as other ICs including tuners or other processing circuits, such as background scan or traffic data receivers. Specifically, loop-through buffers (LTB) 111a and 111b couple to outputs of amplifiers 110a and 110b, to output a corresponding RF FM signal via loop-through pads (LTA and LTB). As seen, switches S1 and S2 may be controlled (e.g., under control of MCU 150) to enable output of such FM signals. Similarly, loop-through buffers 113a and 113b couple to outputs of amplifiers 112a and 112b, to output a corresponding RF Band-III signal via the loop-through pads, as controlled by switches S1 and S2. As also shown, a loop-through buffer 115 may output an AM RF signal output by LNA 114 via another loop-through pad, AMO.

With reference now to second tuner $130_2$ on the same IC, a second set of mixers $120_{21}$-$120_{25}$ are provided. As seen, each mixer is coupled to receive an incoming amplified RF signal from one of amplifiers 110a/b, 112a/b, and 114. In turn, each mixer 120 downconverts the received RF signal with a mixing signal, received from a LO $124_2$, which in turn receives an incoming clock signal, generated by an RF synthesizer $122_2$. In one embodiment, RF synthesizer $122_1$ may be configured for operation at substantially around 4.4 GHz or another frequency substantially separated from the output of RF synthesizer $122_1$.

The downconverted signals output by mixers 120 are coupled through a selector $125_2$ (which in an embodiment may be implemented as a multiplexer) to a programmable gain amplifier $126_2$. After amplification in PGA $126_2$, the signal is digitized in an ADC $128_2$. From there the digitized downconverted signal may be provided to a signal processing path of tuner $130_2$, which may perform various processing, including filtering, gain control, decoding and/or demodulation to output a demodulated signal such as demodulated FM or AM signals, or a modulated signal, such as in the case of DAB or HD input.

More specifically, FIG. 1B illustrates high level circuitry further present in a multi-tuner IC. More specifically, after digitization in corresponding ADCs $128_1$, $128_2$ the digitized downconverted signals are provided to separate signal processing paths of tuners $130_1$, $130_2$. In the embodiment shown, such tuner circuitry may be implemented as radio digital signal processors (DSPs) $135_1$, $135_2$. As described above, depending upon particular mode and band of operation, radio DSPs 135 may further condition and process the digitized signals and demodulate the signals to result in demodulated signals, e.g., of an FM band, which can be directly output from radio DSPs 135.

Still further, additional processing circuitry may be provided. As shown, an audio processor 140 may be provided to further process the demodulated signals. In the illustrated embodiment, audio processor 140 includes a phase diversity circuit 142. In various embodiments, phase diversity circuit 142 may be configured to receive common content, e.g., of a given radio station by way of the multiple signal processing paths and perform phase diversity by selecting a given one of the two signals for output, e.g., based on signal quality metrics. In another embodiment, phase diversity circuit 142 may be configured to perform phase diversity processing based on a maximal ratio combining technique.

As further illustrated, audio processor 140 may further include a linker circuit 144. In various embodiments, linker circuit 144 may be configured to perform seamless linking, such that the same audio content as obtained from two different antennas (and potentially two different bands), can be linked together. For example, linker circuit 144 may be configured to enable a smooth transition from audio content obtained from an FM signal output to audio content obtained from a DAB signal output when reception conditions for the FM signal fall below a threshold (and vice versa). This linking may be performed seamlessly or transparently to the user, such that the user does not detect the transition, nor is the audio output adversely affected. As further illustrated, audio processor 140 may further include an audio DSP 146, which may perform further audio processing as desired to output a stream to a digital-to-analog converter (DAC) 150, such that an audio output is provided.

Still further shown, audio processor 140 may further receive incoming audio input, e.g., from a similarly configured second IC including one or more receivers/tuners (and/or from a downstream external linker circuit/demodulator).

Thus in the embodiment of FIGS. 1A and 1B, each tuner 130 can receive its input from any one of two FM, two Band-III, and one AM RF antenna input. Each RF input can simultaneously drive either or both of the IF signal paths of these tuners and/or a loop-through buffer for connecting to a downstream receiver such as a background scan or traffic data receiver. When one RF input is used to feed both IF signal paths, both paths will have symmetric performance (which is a desirable characteristic in that signal levels, phases, and other characteristics are identical (or nearly identical)). Another benefit of an architecture as in FIGS. 1A and 1B is that a substantially seamless transition between different operating states can be accomplished entirely on-chip under control of MCU 150. That is, a transition of operating mode can occur in a manner transparent to a listener, as the transition occurs without any audible click, pop, delay or other signal distortion.

In an embodiment, frequency synthesizers $122_1, 122_2$ may include LC tank-based voltage controlled oscillators (VCOs) that operate at substantially different frequencies, to reduce unwanted coupling. In the example described above, frequency synthesizer $122_1$ may operate at approximately 3.0 GHz, while frequency synthesizer $122_2$ is to operate substantially at approximately 4.4 GHz. Understand that these frequency synthesizers can be dynamically controlled by MCU 150 to operate at a given frequency, which may vary depending upon band of operation. In any case, these frequency synthesizers (and more specifically the VCOs included therein) may be constrained from operation within a given frequency range of each other. In one embodiment, MCU 150 may control the VCOs to maintain a minimum frequency separation of 500 megahertz (MHz). In addition, frequency synthesizers 122 may be controlled to vary frequency using a rasterization technique, such that any changes to the VCO frequencies occur in steps of at least 500 kilohertz (kHz), to minimize harmful coupling between VCOs and reduce spurs in the LO outputs.

With this frequency separation of frequency synthesizers 122, frequencies generated by the different VCOs, which may include the fundamental oscillation frequency of each oscillator as well as harmonic frequencies thereof, avoid coupling to one another, preventing large spurs in each other. By using frequency synthesizers that operate at two very different frequency ranges (and which are mutually exclusive ranges), the level of the spurs can be greatly reduced, in that the LC tank frequency response of the VCOs can attenuate the energy coupled from one VCO to the other. In one example, the LC tanks of the two different frequency synthesizers can be of substantially different inductances to realize the frequency separation. As one such example, to enable RF synthesizer $122_2$ to operate at 4.4 GHz, the LC tank may have a given capacitance (e.g., x picoFarads, where x can vary in different embodiments) and an inductance of approximately 800 picoHenries in an example embodiment. In turn, RF synthesizer $122_1$, to operate at 3.0 GHz may have a capacitance of 1.6× picoFarads and an inductance of approximately 1 nanoHenry.

To further reduce spurs, LOs $124_1, 124_2$ may be implemented within respective shielded regions. Two different FM or Band-III stations can be received within the same IC and not have the spurs that would be associated when using two VCOs of the same frequency range. Understand while shown at this high level in the embodiment of FIGS. 1A and 1B, many variations and alternatives are possible.

Figure 2:
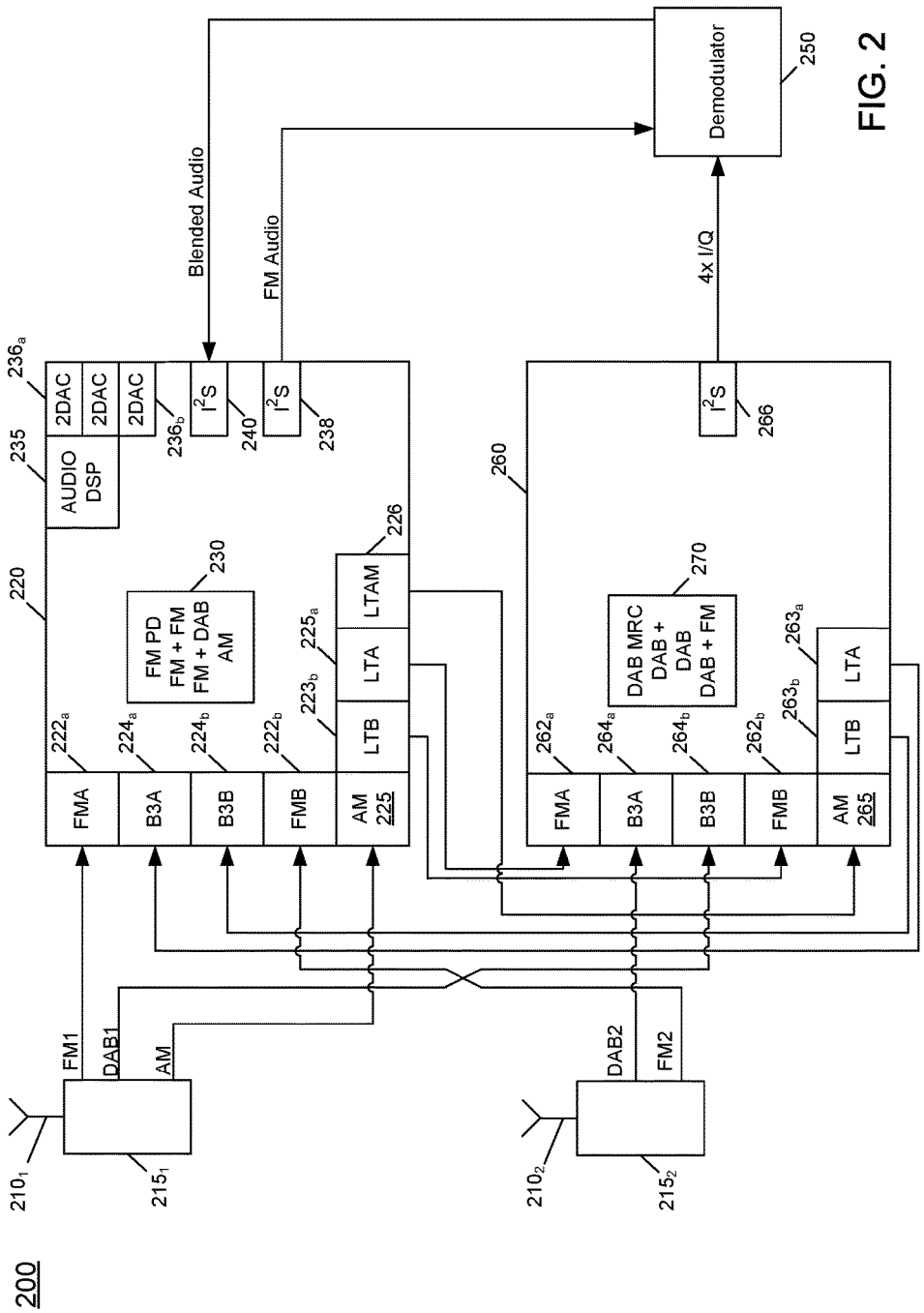
FIG. 2 is a block diagram of a multi-chip radio system in accordance with an embodiment.

Referring now to FIG. 2, shown is a block diagram of a multi-chip radio system in accordance with an embodiment. As shown in FIG. 2, system 200 may be implemented as an automotive radio system that has multiple tuner chips, namely a first tuner chip 220 and a second tuner chip 260, along with a third demodulator chip 250. Understand while shown with three different ICs in this embodiment, in other cases some or all of the hardware circuitry of these three different ICs can be implemented into one or more die of a single IC. Still further, different variations in the amount and type of circuitry of each IC is possible.

As illustrated, incoming RF signals are received by a plurality of antennas $210_1$-$210_2$. Understand while shown with two antennas for ease of illustration, in many cases a given vehicle may include more than two antennas. As examples, some vehicles may include two (or more) FM antennas, two (or more) Band-III antennas, and at least one AM antenna. However for ease of illustration, two representative antennas are shown (understanding that this representation of two may actually be implemented as more than two antennas).

To recover RF signals of given bands, antennas 210 may couple to filters/antenna switches $215_1$-$215_2$, which may perform appropriate filtering to thus output RF signals of at least three bands, namely FM, DAB and AM. In particular vehicle installations, antennas 210 and switches 215 may be implemented at a given location, e.g., near a rear of a vehicle, as antennas 210 may be implemented on rear windows, rear side windows, a roof or trunk-mounted unit or so forth. Circuitry may be provided in close proximity to such antennas to provide the RF signals, e.g., via one or more coaxial cables, to tuners 220/260.

In the embodiment shown, tuners 220/260 may be separate instantiations of the same tuner device. However, these different tuners may be differently configured to perform different primary functions. As such, each tuner is shown with different constituent components in FIG. 2. Thus as illustrated, tuner 220 may be configured to operate as a primary FM and AM tuner, while tuner 260 may be configured to operate as a primary DAB tuner. More specifically, with reference to tuner 220, it includes dual tuner circuitry 230 to perform FM phase diversity processing, dual FM channel processing (e.g., two different FM channels, one for a primary entertainment system and one for a secondary (e.g., rear seat) entertainment system), FM and DAB seamless linking, and AM band operations (and of course single channel FM reception).

As such, tuner 220 is configured to directly receive FM RF signals from antennas $210_1$ and $210_2$ via input pads $222_a$ and $222_b$. In addition, to enable the same signals to be provided to second tuner 260, the incoming FM RF signals may be output via loop-through pads $223_a$ and $223_b$. Similarly, as tuner 220 acts as a secondary DAB tuner, it receives incoming DAB band RF signals indirectly from second tuner 260, rather than directly from antennas 210, via input pads $224_a/224_b$. As further illustrated, tuner 220 receives an AM band RF signal via input pad 225.

After appropriate processing of one or more FM signals in dual tuner circuitry 230, resulting demodulated signals can be provided to an audio digital signal processor (DSP) 235 for additional audio processing (e.g., multi-channel processing) such that audio outputs can be provided via multiple channels $236_a$-$236_c$ including corresponding digital-to-analog converters to enable audio output to desired destinations (e.g., multiple channels of speakers). As further shown, demodulated FM audio can be output via pad 238 to demodulator 250, as described below. As further shown, blended audio can be received via pad 240 to enable further audio processing in audio DSP 235 and output from tuner 220.

In similar manner, tuner 260 includes dual tuner circuitry 270 to perform DAB phase diversity or multi-ratio combining processing, dual DAB channel processing (e.g., two different DAB channels, one for a primary entertainment system and one for a secondary (e.g., rear seat) entertainment system), FM and DAB seamless linking.

As such, tuner 260 is configured to directly receive DAB RF signals from antennas $210_1$ and $210_2$ via input pads $264_a$ and $264_b$. In addition, to enable the same signals to be provided to first tuner 220, the incoming DAB RF signals may be output via loop-through pads $263_a$ and $263_b$. Similarly, as tuner 260 acts as a secondary FM tuner, it receives incoming FM RF signals indirectly from first tuner 220, rather than directly from antennas 210, via input pads $262_a/262_b$. As further illustrated, tuner 260 receives an AM band RF signal via loop-through pad 265.

After appropriate processing of one or more DAB signals in dual tuner circuitry 270, resulting DAB-modulated signals can be provided to demodulator 250 via pad 266 for demodulation and potentially linking with an FM signal from first IC 220.

As further illustrated in FIG. 2, demodulator 250 may be configured to demodulate incoming modulated DAB signals received from tuner 260. More specifically, dual tuner circuitry 270 may output DAB signals from both tuners as two sets of I/Q data to demodulator 250, which may thus demodulate the DAB signals and provide the demodulated DAB signals to first tuner 220 for further audio processing and output. Similarly, when a mode of operation for FM-DAB blending is active, demodulator 250 may perform seamless linking between the same audio content from these two different bands. To this end, demodulator 250 may include a large amount of memory, e.g., buffer circuitry, to buffer processed audio of a leading one of these bands, so that the common content of the two bands may be linked up in time such that transitioning between either stream is not noticeable to the listener. Note also that demodulator 250 may further perform maximal ratio combining (MRC) phase diversity for HD and/or DAB signals.

Understand also that while FIG. 2 shows an implementation with multiple separate ICs, embodiments are not so limited and in another implementation more than two tuners may be adapted within a single IC, e.g., all adapted on a single semiconductor die or as separate die within a multi-chip module (MCM). In some cases, the external modulator/linker 250 also may be implemented within an IC, e.g., on a single semiconductor die or as part of a MCM.

Figure 3:
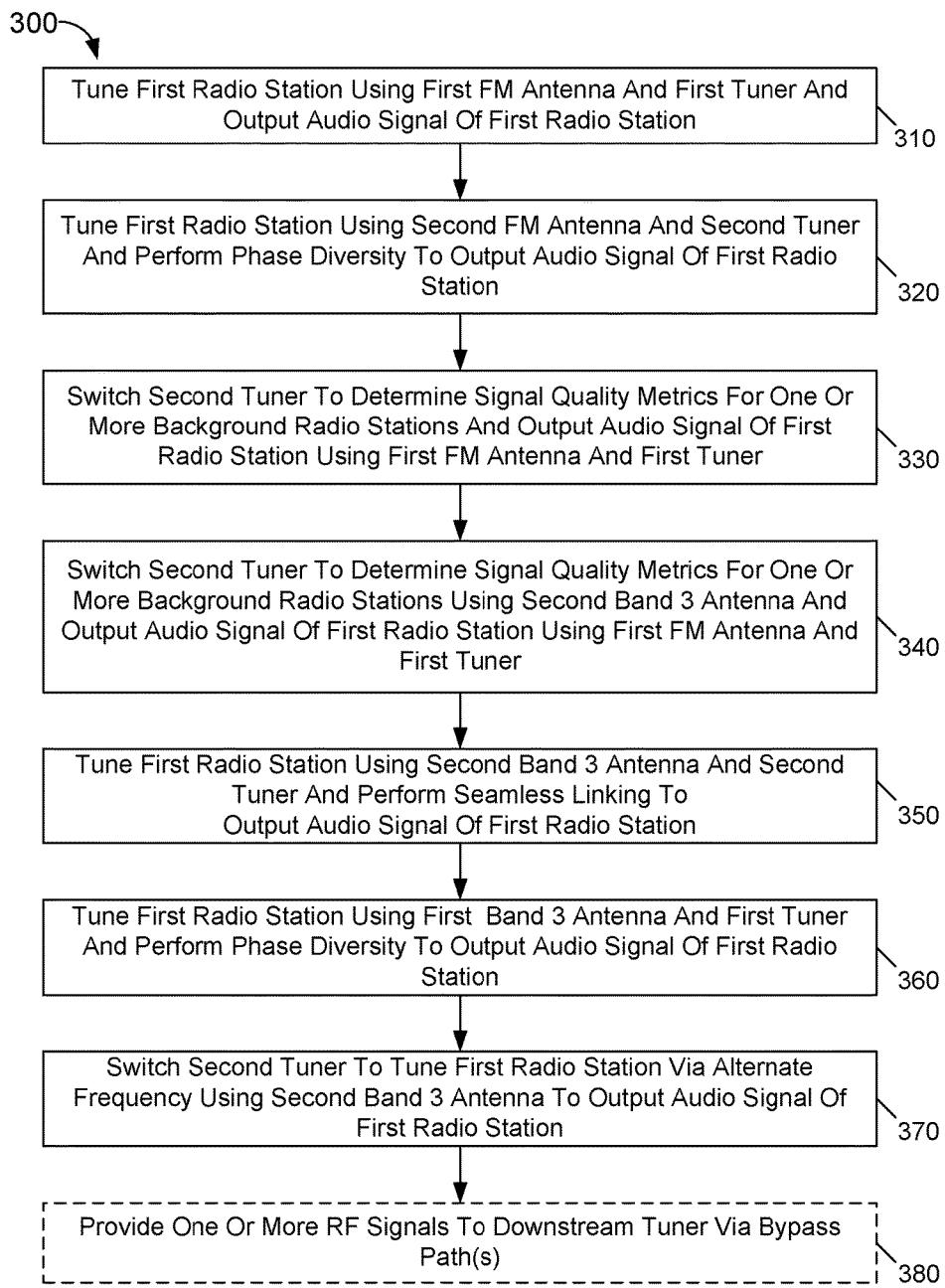
FIG. 3 is a flow diagram of a method in accordance with an embodiment.

Referring now to FIG. 3, shown is a flow diagram of a method in accordance with an embodiment. As shown in FIG. 300, a control logic, such as a hardware-based microcontroller of a tuner, which may be in communication with a host processor of an entertainment system, may be configured to cause a multi-tuner as described herein to perform in a wide variety of different operation modes. Understand that the following discussion of FIG. 3 is primarily with regard to receipt and processing of a first radio station desired by a listener. Of course understand that many of the different modes of operation and transitions between them can occur when a listener desires to tune to a different station. In the various modes of operation described herein, background operations also may be performed. Such operations, which may be performed on one or both tuners, can be used to perform background scans of available stations and determine signal quality metrics thereof.

In addition, non-audio data such as RDS and/or traffic data may be obtained by these background operations. Information determined by way of these tuners can be provided to the microcontroller, which in turn may be in communication, e.g., via a given software application programming interface (API), with the host processor. As such, the host processor may be the primary initiator of audio system mode transitions described herein, based on user input and operating program. In turn, the host processor provides instructions to the microcontroller, to cause the microcontroller to flexibly configure and re-configure the multi-tuner to perform in a given mode of operation and transition as appropriate between operating modes.

With reference to FIG. 3, in a first mode of operation (block 310), a first radio station is tuned using a first FM antenna and a first tuner. After appropriate signal processing of the received FM signal, an audio signal of the first radio station can be output, from the first tuner to an output of the entertainment system (e.g., speakers).

In another mode of operation (block 320), phase diversity may be performed to cause this same first radio station to be output by both tuners as modulated signal to be combined in a phase diversity combining circuit, and thereafter demodulated and output as an audio signal. Here, each tuner is coupled to a different antenna, to enable this phase diversity operation. This transition may be initiated when the first antenna suffers an impairment in signal reception, e.g., due to multipath fading. Note that the transition between single antenna reception and phase diversity reception may occur seamlessly, that is without any audio artifact, pop, click or other audible distortion.

At block 330 another mode of operation may occur to perform background scanning. More specifically, the microcontroller may cause the second tuner to be switched to a background scan mode to determine signal quality metrics for one or more background radio stations (as well as for the first radio station). As discussed above, this information as determined in the second tuner can be provided to the microcontroller that in turn provides it to the host processor. In this mode, the first tuner may continue to tune and output the first radio station.

In addition to determining signal quality metrics for FM channels, the tuner may also perform such background scan operations with regard to DAB channels. As such, in another mode of operation as shown at block 340 this second tuner may be switched to receive an input from a Band-III antenna to perform such background scanning. In this mode still, the first tuner may process and output the first radio station.

Assume that as a vehicle travels, its signal quality for this first radio station received via the FM band begins to degrade. However, assume also presence of an available DAB channel for this same radio station. In this instance, at block 350 another mode of operation enables the first radio station to be tuned in a DAB channel via the second tuner. These two signals of the same content may then be seamlessly linked, accounting for delay differences between the two signals. In an embodiment, this seamless linking may be performed by downstream circuitry such as a separate demodulator/linker chip. Thereafter, operation may continue with the first radio station being received and processed using the DAB channel. Thus at this point the first tuner is available, and at block 360 another mode of operation enables phase diversity processing for the DAB channel. As such, the first tuner may be controlled to receive a Band-III signal from a Band-III antenna and output the DAB channel to perform phase diversity processing.

In some instances, audio content of a given radio station may be transmitted on multiple or alternate frequencies, e.g., where each of multiple transmit antennas is located in a different geographic location. Assume that a vehicle is travelling such that it begins losing the signal from a first transmit antenna that transmits at a first frequency. However, based on background scanning it is determined that the same audio content is available on an alternate frequency, e.g., via a same or different radio station having a transmit antenna that transmits at a second frequency. Thus as shown at block 370, alternate frequency switching may be performed such that the second tuner is switched to tune to the radio station via an alternate frequency (e.g., using a DAB input). After appropriate blending, audio content of this alternate frequency station can be output via the second tuner.

As further shown in FIG. 3, at block 380 (shown in a dashed box as being optional), one or more of the received RF signals can be provided to one or more downstream tuners via bypass paths, such as the loop-through buffers described above.

Understand while shown with these particular modes of operation and switching of control between the different tuners is shown, many variations and alternatives are possible. Furthermore, while specific transitions between the different modes of operation are described above, it is possible for many other transitions between the modes described above and other modes to occur. Still further, while specific representative tuners to process given RF signals from given antennas were discussed above, understand that such selection is arbitrary, and a given programming of an MCU or other control logic with programmable instructions stored in a non-transitory storage medium may call for the operation to be performed by different tuners or combinations of tuners. And while the above examples relate to AM, FM and DAB bands, embodiments apply to tuners and control logic configured for additional radio bands.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first configurable tuner adapted on a semiconductor die, the first configurable tuner including a first set of mixers, each of the first set of mixers to be coupled to a radio frequency (RF) signal obtained from one of a plurality of RF sources, a selection circuit to provide a downconverted signal from a selected one of the first set of mixers to a signal processing path of the first configurable tuner, and at least one buffer to buffer at least one RF signal obtained from the plurality of RF sources for output from the semiconductor die;
a second configurable tuner adapted on the semiconductor die, the second configurable tuner including a second set of mixers, each of the second set of mixers to be coupled to a RF signal obtained from one of the plurality of RF sources, a second selection circuit to provide a second downconverted signal from a selected one of the second set of mixers to a signal processing path of the second configurable tuner, and at least one second buffer to buffer at least one RF signal obtained from the plurality of RF sources for output from the semiconductor die; and
a controller to dynamically configure at least one of the first configurable tuner and the second configurable tuner to receive and process incoming RF signals in a plurality of operational modes.

2. The apparatus of claim 1, wherein the apparatus further comprises a first low noise amplifier (LNA) to receive a first RF signal from a first RF source of the plurality of RF sources and output an amplified first RF signal to the first configurable tuner and the second configurable tuner.

3. The apparatus of claim 2, wherein the at least one buffer comprises a first loop-through buffer coupled to an output of the first LNA, the first loop-through buffer to provide the amplified first RF signal to a destination circuit.

4. The apparatus of claim 3, wherein the destination circuit comprises a background scan receiver.

5. The apparatus of claim 3, wherein the destination circuit comprises a traffic data receiver.

6. The apparatus of claim 1, wherein the controller comprises a microcontroller.

7. The apparatus of claim 1, wherein the signal processing path of the first configurable tuner comprises a first digital signal processor to demodulate the downconverted signal into a first demodulated signal.

8. The apparatus of claim 7, wherein the signal processing path of the second configurable tuner comprises a second digital signal processor to demodulate the second downconverted signal into a second demodulated signal.

9. The apparatus of claim 8, wherein the apparatus further comprises an audio processor coupled to receive the first demodulated signal and the second demodulated signal and to select one of the first demodulated signal and the second demodulated signal for output from the semiconductor die.

10. The apparatus of claim 8, wherein the apparatus further comprises a phase diversity circuit to combine the first demodulated signal and the second demodulated signal based on signal quality information.

11. The apparatus of claim 8, wherein the apparatus further comprises a linker circuit to transition an audio output from the first demodulated signal to the second demodulated signal based on reception conditions.

12. A system comprising:
a first tuner to receive a plurality of radio frequency (RF) signals from a plurality of antennas, the first tuner to receive a first FM RF signal via a first input pad of the first tuner, the first tuner having a first plurality of mixers including a first mixer to selectively be coupled to receive and downconvert the first FM RF signal to a first downconverted signal, the first tuner to process the first downconverted signal; and
a second tuner to receive at least some of the plurality of RF signals from the plurality of antennas, the second tuner to receive a second FM RF signal via a first input pad of the second tuner, the second tuner having a second plurality of mixers including a second mixer to selectively be coupled to receive and downconvert the second FM RF signal to a second downconverted signal and a first mixer to selectively be coupled to receive and downconvert the first FM RF signal to a third downconverted signal, the second tuner controllable to process a selected one of the second downconverted signal and the third downconverted signal provided by a selected one of the second mixer and the first mixer of the second tuner.

13. The system of claim 12, further comprising a switch to provide the first FM RF signal to the first tuner and to the second tuner simultaneously.

14. The system of claim 12, further comprising a phase diversity combining circuit to combine the first downconverted signal and the second downconverted signal to output an audio signal.

15. The system of claim 14, further comprising an audio processor to seamlessly transition from a first mode in which the first downconverted signal and the second downconverted signal are combined to a second mode in which the second tuner provides background information.

16. The system of claim 13, further comprising:
a first low noise amplifier (LNA) to receive and amplify the first FM RF signal; and
a first loop-through buffer coupled to an output of the first LNA to receive the first FM RF signal and output the first FM RF signal to the second tuner, wherein the output of the first LNA is further coupled to the first mixer of the first tuner.

17. The system of claim 16, further comprising:
a second LNA to receive and amplify the second FM RF signal; and
a second loop-through buffer coupled to an output of the second LNA to receive the second FM RF signal and output the second FM RF signal to the first tuner.

18. The system of claim 13, wherein the first tuner comprises a first frequency generator to operate at a first frequency and the second tuner comprises a second frequency generator to operate at a second frequency substantially different than the first frequency when the first tuner and the second tuner are to process the first FM RF signal.

19. A method comprising:
in a first mode, controlling a first tuner to receive and process a first radio frequency (RF) signal from a first antenna configured for a first band to output a first audio signal of a first radio station and controlling a second tuner to receive a second RF signal from a second antenna configured for the first band to determine signal quality metrics for one or more radio stations of the first band, including the first radio station; and
in a second mode, controlling the first tuner to output a first signal representation of the first RF signal and controlling the second tuner to receive and process the second RF signal from the second antenna to output a second signal representation of the second RF signal, processing the first and second signal representations to output a second audio signal of the first radio station, to transition an output of a receiver from the first audio signal to the second audio signal.

20. The method of claim 19, further comprising in a third mode, controlling the first tuner to receive and process the first RF signal from the first antenna to output the first audio signal of the first radio station, and controlling the second tuner to receive and process the second RF signal from the second antenna to output a third audio signal of a second radio station, and transitioning the output from the first audio signal to the third audio signal.

* * * * *